United States Patent [19]

Davidson et al.

[11] 3,745,539

[45] July 10, 1973

[54] LATCH TYPE REGENERATIVE CIRCUIT FOR READING A DYNAMIC MEMORY CELL

[75] Inventors: Evan E. Davidson, Hopewell Junction; Ralph D. Lane, Wappingers Falls; Jerry Saia, Poughkeepsie, all of N.Y.

[73] Assignee: International Business Machines Corporation, Armonk, N.Y.

[22] Filed: Mar. 20, 1972

[21] Appl. No.: 235,897

[52] U.S. Cl. .......... 340/173 R, 307/238

[51] Int. Cl. .......... G11c 11/40

[58] Field of Search .......... 340/173 R, 137 DR; 307/238

[56] References Cited

UNITED STATES PATENTS 3,387,286 6/1968 Dennard .......... 340/173

*Primary Examiner*—Terrell W. Fears
*Attorney*—Robert J. Haase et al.

[57] ABSTRACT

A semiconductor device circuit for reading an FET capacitor store dynamic memory cell and for regenerating the charge (if any) in said capacitor whereby non-destructive read-out is achieved. The memory cell includes an FET switch for selectively connecting the storage capacitor to a memory array bit-sense line through either one of a pair of oppositely connected bipolar transistors for reading and writing, respectively. The bit-sense line is connected to the input terminal of a latching regenerative feedback amplifier such as a silicon controlled rectifier. The potential level at said input terminal rises to a relatively higher level by regenerative feedback action in response to a relatively lower bit-sensing voltage which initiates the latching action. The storage capacitor of the memory cell is recharged via one of the bipolar transistors in response to the aforesaid relatively higher potential at the the amplifier input terminal. Bipolar current switch embodiments as well as a silicon controlled rectifier embodiment are disclosed for instrumenting the latching regenerative feedback amplifier.

6 Claims, 3 Drawing Figures

LATCH TYPE REGENERATIVE CIRCUIT FOR READING A DYNAMIC MEMORY CELL

BACKGROUND OF THE INVENTION

1. Field of the Invention

The invention generally relates to writing and reading circuits for dynamic-type FET memory cells, and more particularly, to a latching-type reading circuit whereby non-destructive read-out of such a cell is achieved.

2. Description of the Prior Art

High density FET memory arrays have been proposed wherein each cell comprises a capacitor which is discharged and charged through a single field effect transistor. A given cell in the array is addressed by pulsing the FET gate electrode to render the respective FET conductive thus connecting the capacitor to a respective bit-sense line in the memory array. The capacitor is charged or set to a binary "1" by raising the potential of the bit line at the same time that the FET gate electrode is pulsed. The capacitor is discharged or set to a binary "0" by lowering the bit line potential while the FET gate electrode is pulsed. As is well understood, the charged capacitor is discharged whenever the memory cell is "read." It is necessary to restore such charge following each reading operation in order to avoid permanent loss of the binary 1 stored in the cell. In addition, it is also necessary to replenish the memory cell capacitor charge at regular intervals (even if the cell is not read) in order to replace charge lost by leakage. Regeneration of lost charge in prior art dynamic memory cell arrays is achieved by the initiation of special writing cycle similar to the one in which the binary data was initially placed in the cell. This often is done with the aid of a latching type circuit which receives data at its input terminal from a respective memory cell during a reading cycle, stores the data and makes it available as a signal at its output terminal for subsequent use during the aforementioned special writing cycle.

SUMMARY OF THE INVENTION

In accordance with the present invention, data readout and data regeneration are accomplished during the same reading interval which is extended slightly in duration relative to prior art reading intervals in order to exploit the inherent voltage rise at the input terminal of a positive feedback amplifier latching circuit which occurs immediately upon the initiation of latching action. The voltage rise reverses the charge flow with respect to the memory cell storage capacitor and replaces the charge lost during reading.

More particularly, the stored charge representing a binary 1 in a given cell is coupled to a respective bit-sense line in the memory array causing the potential of the line to rise to a value triggering latching action in the positive feedback amplifier circuit coupled to the line. The potential of the line rises above the triggering level as a result of the regenerative action occurring within the latching circuit to a value which causes a charge reversal, i.e., a flow of charge from the bit-sense line into the storage capacitor. The field effect transistor through which the storage capacitor is connected to the bit-sense line is held conductive for a time interval sufficient to allow for the flow of bit charge from the storage capacitor to the line (reading interval) as well as the immediately following reverse flow of charge to the storage capacitor from the line (regeneration interval). Increased switching speed both in the reading and writing modes is achieved by the provision of an oppositely poled pair of bipolar transistors connected between the FET of a given memory cell and its associated bit-sense line, each transistor providing current gain during its respective reading and writing conduction interval.

DESCRIPTION OF THE PREFERRED EMBODIMENT

Figure 1:
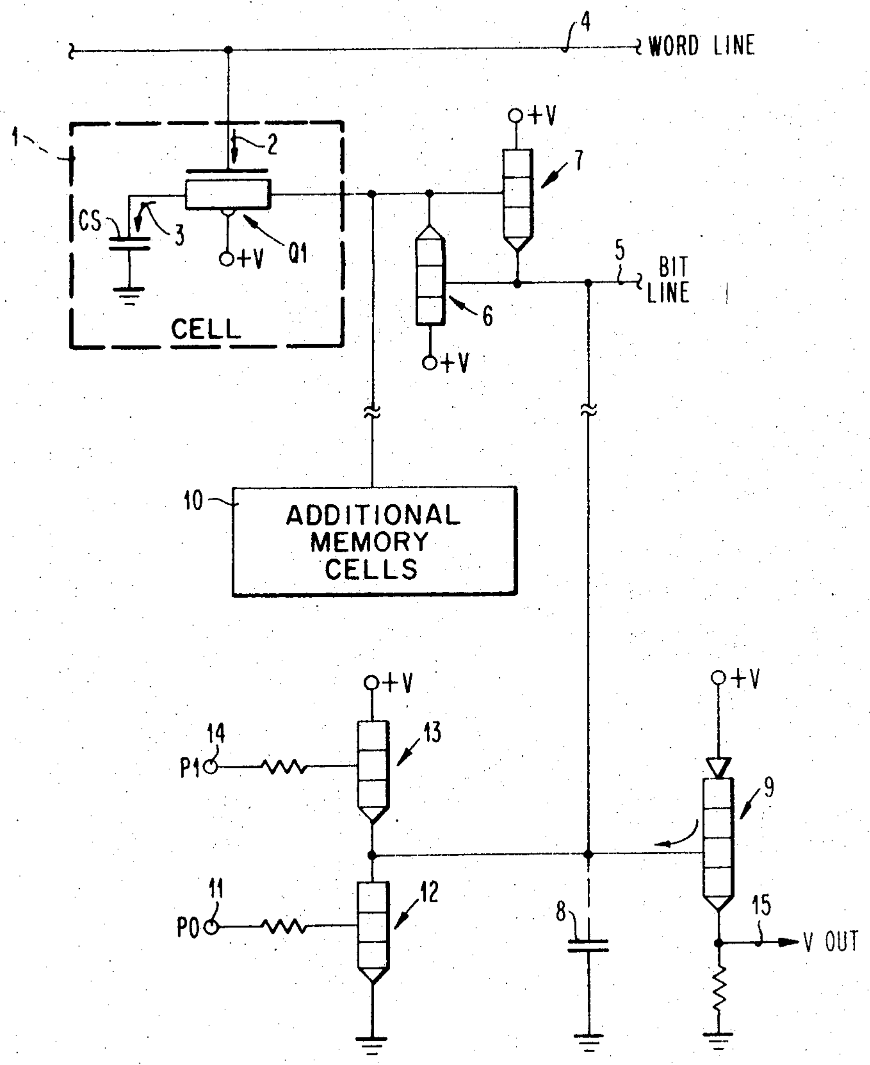
FIG. 1 is a simplified schematic diagram of a silicon controlled rectifier embodiment of the present invention.

Referring to FIG. 1, memory cell 1 is a conventional high density single FET device cell comprising FET 2 and capacitor 3. Capacitor 3 is connected between ground and the drain of FET 2. The gate electrode of FET 2 is connected to word line 4. The source of FET 2 is connected to bit-sense line 5 through a pair of oppositely connected emitter follower transistors 6 and 7. Transistor 6 provides a uni-directional path with current gain for charging capacitor 3 (through conducting FET 2) from bit-sense line 5 during a writing cycle. Transistor 7 provides a uni-directional path with current gain for sensing the charge (if any) on capacitor 3 during a reading cycle. Said charge flows from capacitor 3 (through conducting FET 2) into the base of transistor 7 for charging the distributed capacitance 8 of bit-sense line 5 to a value sufficient for triggering PNPN silicon controlled rectifier 9. Emitter followers 6 and 7 may be shared between several memory cells similar to cell 1 as suggested by additional memory cells 10.

A reading operation is initiated by pulsing "on" input terminal 11 of transistor 12 which is connected between ground and bit-sense line 5. With transistor 12 conducting, SCR 9 is automatically reset to its "off" condition. Transistor 13 is held "off" by the potential applied to base input terminal 14. Transistor 13 is connected between a source of positive potential +V and bit-sense line 5. After transistor 12 is turned off by termination of the pulse applied to terminal 11, word line 4 is pulsed down to turn on FET 2, permitting capacitor 3 to discharge into the base circuit of transistor 7. The resulting base current renders transistor 7 conductive thereby charging up the bit-sense line 5. When the conduction threshold potential of SCR 9 is reached, it quickly snaps "on." Due to the regenerative action of the inherent positive feedback in SCR 9, the voltage level of the bit-sense line jumps abruptly to a higher value causing transistor 6 to become conductive. Word line 4 is maintained in its down condition whereby FET 2 continues to conduct allowing capacitor 3 to be recharged by conducting emitter follower 6. Thus, the charge lost by capacitor 3 during the initial part of the reading cycle when bit-sense line 5 is charged up and SCR 9 is latched on is fully replenished during the terminal part of the same reading cycle when the abrupt increase in potential on bit-sense line 5 switches off transistor 7 and turns on transistor 6 while FET 2 remains conductive.

It should be noted that in the event that capacitor 3 were discharged (representing the binary value 0) at the start of the reading cycle, neither transistor 7 nor SCR 9 would be rendered conductive. Without conduction in the SCR, regenerative latching action would not take place, bit-sense line 5 would not be raised to a higher potential, transistor 6 would not turn on and capacitor 3 would remain discharged.

A binary zero is written into cell 1 by pulsing down word line 4 and pulsing up terminal 11 simultaneously. Bit-sense line 5 is discharged to a low level allowing transistor 7 to turn on as capacitor 3 (if it already is charged) discharges through conducting FET 2 into the base circuit of transistor 7. A binary 1 is written into cell 1 by pulsing up terminal 14 instead of terminal 11. This causes bit-sense line 5 to charge up to a value causing transistor 6 to become conductive thereby charging up capacitor 3 through conducting FET 2. It should be noted that SCR 9 maintains at output terminal 15 whatever binary value is placed into cell 1 during a write operation. That is, SCR 9 remains off when a zero is written into the cell and is latched on when a one is written into the cell.

Information must be regenerated periodically in cell 1 to replace charge lost by leakage. This is accomplished merely by initiating a reading cycle (one word at a time) in the memory array. The output signal on terminal 15 may be disregarded when a reading cycle is initiated for purposes of refreshing the data in the memory cells at times other than that when it is desired to sense the stored binary data.

Figure 2:
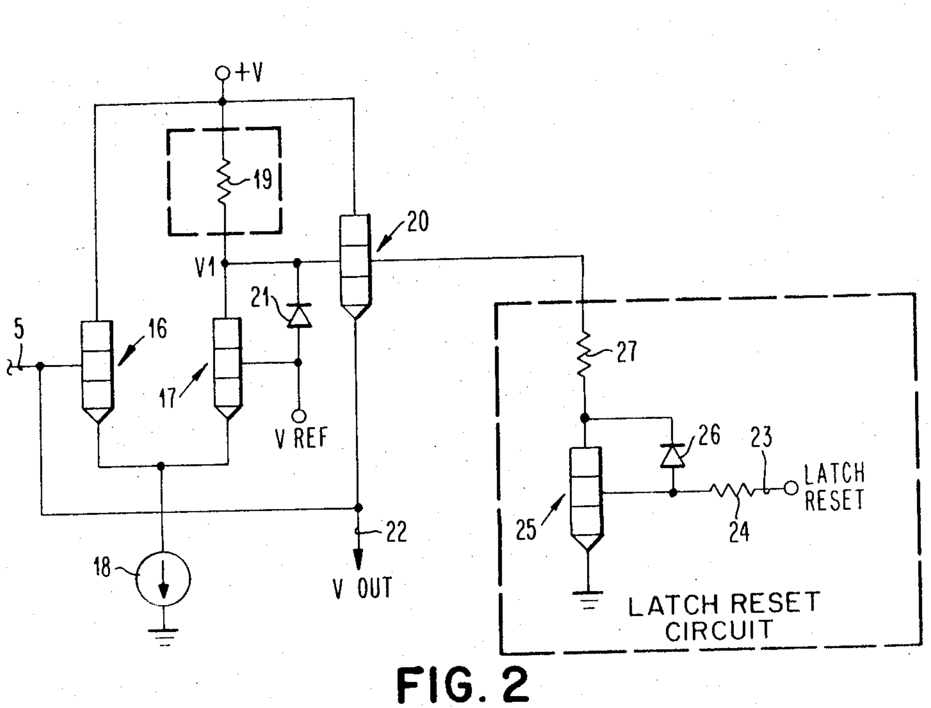
FIG. 2 is a alternative embodiment in which a current switch-type circuit is substituted for the silicon controlled rectifier.

Faster latching action is obtainable utilizing a bipolar current switch and emitter follower latching circuit as shown in FIG. 2 in lieu of the silicon controlled rectifier 9 of FIG. 1. As will be seen, the latching circuit of FIG. 2, like that of FIG. 1, possesses the characteristic that upon latching the input voltage level (on the bit-sense line) is driven by positive feedback action to a value above the threshold at which latching action is initiated. The bipolar current switch comprises transistors 16 and 17 whose commonly connected emitters are coupled to ground through current source 18. The collector of transistor 16 is connected directly to voltage source +V while the collector of transistor 17 is connected to the same voltage source through resistor 19. The base of latching transistor 20 is connected to the collector of transistor 17. The collector of transistor 20 is directly connected to voltage source +V. The emitter of transistor 20 is connected to output terminal 22 and back to the base of transistor 16 which is connected to bit-sense line 5. Bit-sense line 5 is connected to a plurality of dynamic memory cells as is illustrated by cells 1 and 10 of FIG. 1.

The latching circuit comprising transistors 16,17 and 20 is reset by a signal applied to terminal 23 of resistor 24 whose other terminal is connected to the base of transistor 25. Diode clamps 26 and 21 prevent saturation in their respective transistors. The emitter of transistor 25 is connected to ground while the collector is connected through resistor 27 to the base of transistor 20.

The latching circuit of FIG. 2, like the silicon controlled rectifier 9 of FIG. 1, is used for both voltage sensing and for regenerating the state of the selected memory cell. In the event that a "0" is stored in the addressed memory cell (not shown) connected to bit-sense line 5, the voltage at the base of transistor 16 is below the level of the reference voltage $V_{REF}$ applied to the base of transistor 17 whereby transistor 16 is cut off and transistor 17 is rendered conductive. The conduction of transistor 17 lowers the potential at node V1 to a value equal to the reference voltage $V_{REF}$ less the drop across conducting diode 21 and turns off transistor 20. This is the "off" state of the latching circuit.

On the other hand, if a "1" is stored in the addressed memory cell (not shown), the potential of bit-sense line 5 is greater than the reference voltage $V_{REF}$ causing transistor 16 to turn on and transistor 17 to turn off. In this case, the voltage at node V1 rises exponentially toward voltage +V through resistor 19 turning on emitter follower 20. The conduction of emitter follower 20 causes the voltage on bit-sense line 5 to follow below the potential at node V1 by the base-to-emitter drop $V_{BE}$ of transistor 20. Eventually, node V1 will reach substantially the power supply voltage +V and the potential of the bit-sense line 5 and output terminal 22 will be equal to $+V - V_{BE}$. The conduction (latching) of transistor 20 is terminated by the application of a reset pulse to terminal 23 which turns on transistor 25 and reduces the potential at the base of transistor 20 below its conduction threshold.

Figure 3:
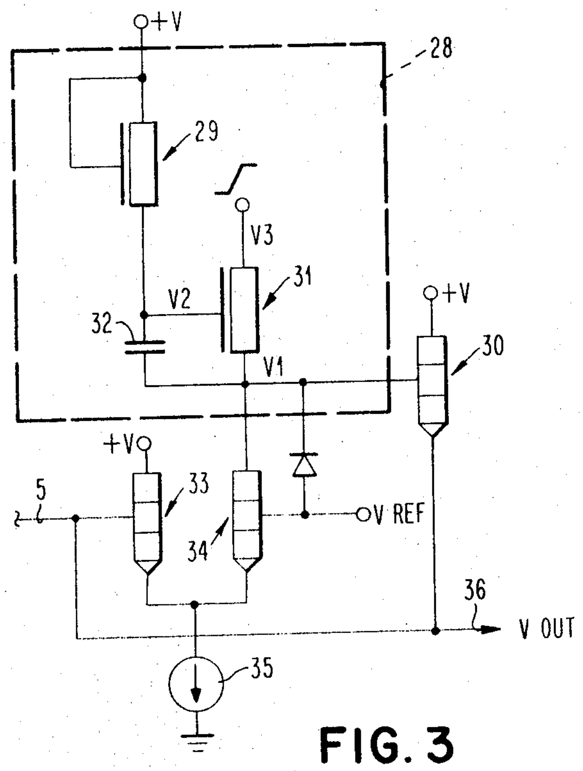
FIG. 3 is a preferred embodiment using an FET feedback load in the current switch-type circuit.

Resistor 19 assumes a relatively high value due to the low operating current of transistor 17 of the bipolar current switch. In addition, resistor 19 presents a layout problem in a very dense memory chip if it were to be fabricated from a diffusion step with current process technology. A preferred design more suitable for high density memory chip applications and yielding fast switching transitions is shown in FIG. 3 wherein pulsed FET feedback load 28 is substituted for resistor 19 of FIG. 2. Approximately an order of magnitude of surface area can be saved by selecting this load design rather than FIG. 2.

The FET feedback load circuit of FIG. 3 operates in the following manner. Load device transistor 29 establishes a potential of +V less the threshold voltage of FET 29 at node V2. Node V3 is pulsed to the voltage level of +V concurrently with the appearance of a read signal on bit-sense line 5. At other times while pulsed node V3 is at ground potential, a low power reset path is provided for turning off latching transistor 30 (corresponding to transistor 20 of FIG. 2) without requiring the additional reset circuitry including transistor 25 of FIG. 2. When node V3 is pulsed to +V during a read operation, node V1 rises in potential via conducting FET 31. Feedback capacitor 32 is employed to feedback the transition at node V1 to the gate of FET 31 at node V2. The value of the feedback capacitor is adjusted to feedback approximately 80 percent of the voltage transition at node V1. This action allows node V1 to be driven positively to the drain voltage +V of FET 31 rather than to a threshold voltage drop below +V as would be the case in the absence of the feedback capacitor. By adjusting the transconductance of FET 31, faster transitions may be obtained at node V1 than are realizable using a simple resistor such as resistor 19 of FIG. 2, for the same power dissipation. A typical value for the feedback capacitor is 0.1 picofarads which can be provided along with the remainder of the FET feedback load 28 in a small chip area. The feedback capacitor may be provided by the gate-to-channel capacitance of FET 31. Transistors 33 and 34 and current source 35 correspond in function to transistors 16 and 17 and current source 18 of FIG. 2. Output terminal 36 of FIG. 3 corresponds to output terminal 22 of FIG. 2.

While this invention has been particularly described with reference to the preferred embodiments thereof, it will be understood by those skilled in the art that the foregoing and other changes in form and details may be made therein without departing from the spirit and scope of the invention.

What is claimed is:

1. In combination, a latching circuit for reading a capacitor store memory cell and for regenerating any charge lost from said cell, said cell being connected to a common read-write line through a pair of unidirectionally conductive devices poled to conduct current in opposite directions with respect to said capacitor and connected in parallel with respect to each other, at least one of said devices producing current gain, said cell comprising a capacitor and an actuatable switch for selectively connecting said capacitor to said line through said pair of devices, said latching circuit having an input terminal connected to said line and possessing the characteristic that upon latching, the voltage level at said input terminal is driven by positive feedback action to a value above the threshold at which latching action is initiated.

2. The combination defined in claim 1 wherein said one of said devices is a bipolar transistor having an emitter connected to said line and a base connected to said switch.

3. The combination defined in claim 1 wherein both of said devices are bipolar transistors each having an emitter, a base and a collector and further including a voltage source, the emitter of one and the base of the other transistor being connected to said switch, the emitter of said other and the base of said one transistor being connected to said line, and the collectors of said transistors being connected to said voltage source.

4. The combination defined in claim 1 wherein said latching circuit comprises a silicon controlled rectifier.

5. The combination defined in claim 1 wherein said switch is a field effect transistor, both said devices are bipolar transistors and said latching circuit is a silicon controlled rectifier.

6. The combination defined in claim 1 including a plurality of said capacitor store memory cells wherein a plurality of said capacitor store memory cells are connected to said common read-write line through the same pair of unidirectional conductive devices.

* * * * *